United States Patent
Na et al.

(10) Patent No.: US 12,524,307 B2
(45) Date of Patent: Jan. 13, 2026

(54) MEMORY DEVICE THAT CHANGES TYPE OF CODEWORD STORED IN MEMORY AREA AND METHOD FOR OPERATING THE SAME

(71) Applicant: SK hynix Inc., Icheon-si (KR)

(72) Inventors: Hyeong Ju Na, Icheon-si (KR); Dong Sop Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/653,742

(22) Filed: May 2, 2024

(65) Prior Publication Data

US 2025/0165343 A1    May 22, 2025

(30) Foreign Application Priority Data

Nov. 21, 2023   (KR) .................. 10-2023-0161741
Jan. 25, 2024   (KR) .................. 10-2024-0011276

(51) Int. Cl.
  *G06F 11/10*   (2006.01)
(52) U.S. Cl.
  CPC ...... *G06F 11/1068* (2013.01); *G06F 11/1004* (2013.01); *G06F 11/1016* (2013.01)
(58) Field of Classification Search
  None
  See application file for complete search history.

(56) References Cited

U.S. PATENT DOCUMENTS

| | | | | |
|---|---|---|---|---|
| 10,432,232 B2 * | 10/2019 | Zamir | ................. | H03M 13/618 |
| 11,656,936 B2 * | 5/2023 | Zhou | ................. | G06F 11/1068 |
| | | | | 714/764 |
| 12,105,585 B2 * | 10/2024 | Oh | ................. | G11C 11/1653 |
| 2015/0286528 A1 | 10/2015 | Cai et al. | | |
| 2015/0339187 A1 | 11/2015 | Sharon et al. | | |
| 2015/0363262 A1 | 12/2015 | Hu et al. | | |
| 2016/0299812 A1 | 10/2016 | Olbrich et al. | | |
| 2017/0075758 A1 * | 3/2017 | Suzuki | ................. | G06F 11/1068 |
| 2019/0377632 A1 * | 12/2019 | Oh | ................. | G06F 11/076 |
| 2020/0119754 A1 * | 4/2020 | Kim | ................. | G06F 11/1068 |
| 2020/0264950 A1 | 8/2020 | Schaefer et al. | | |

(Continued)

FOREIGN PATENT DOCUMENTS

KR   10-2014-0125981 A    10/2014

OTHER PUBLICATIONS

S.-H. Lim, J.-B. Lee, G.-M. Kim and W. H. Ahn, "A Stepwise Rate-Compatible LDPC and Parity Management in NAND Flash Memory-Based Storage Devices," in IEEE Access, vol. 8, pp. 162491-162506, 2020, (Year: 2020).*

(Continued)

*Primary Examiner* — Daniel F. McMahon

(57) ABSTRACT

A memory device includes a memory media including a plurality of memory units and a controller configured to set a plurality of memory areas, each of the plurality of memory areas including one or more of the plurality of memory units. The controller is configured to store one or more first codewords of a first type in a target memory area among the plurality of memory areas, search for a fail memory unit among the memory units included in the target memory area, and when the fail memory unit is searched, convert one or more of the first codewords into a second codeword having a second type and write the converted second codeword to the memory media.

15 Claims, 13 Drawing Sheets

(56) References Cited

U.S. PATENT DOCUMENTS

2020/0266830 A1\* 8/2020 Kim .................. H03M 13/118
2023/0214297 A1\* 7/2023 Oh .................... G06F 11/1004
  714/764

OTHER PUBLICATIONS

Partial European Search Report issued No. EP24214383.2 dated Apr. 29, 2025.

\* cited by examiner

MEMORY DEVICE THAT CHANGES TYPE OF CODEWORD STORED IN MEMORY AREA AND METHOD FOR OPERATING THE SAME

CROSS-REFERENCES TO RELATED APPLICATION

The present application claims priority under 35 U.S.C. § 119(a) to Korean patent application number 10-2023-0161741 filed on Nov. 21, 2023 and to Korean patent application number 10-2024-0011276 filed on Jan. 25, 2024, which are incorporated herein by reference in their entirety.

BACKGROUND

1. Technical Field

Various embodiments of the present disclosure generally relate to a memory device that changes the type of codeword stored in a memory area and methods for operating the same.

2. Related Art

Volatile memory (e.g., SRAM, DRAM) loses stored data when power supply is cut off, and non-volatile memory (e.g. NAND flash, PRAM, MRAM) retains stored data even when power supply is cut off.

The possibility of failure occurring in an area of volatile memory may increase during the manufacturing or during the use of the volatile memory. If it is determined that failure occurred in the codeword stored in the memory area, and if the failure cannot be corrected using an Error Correction Code (ECC), then the volatile memory needs increased error correction performance in the areas where failures are likely to occur.

SUMMARY

Various embodiments of the present disclosure are directed to provide a memory device capable of improving error correction capability in areas where failures are likely to occur, and methods of operating such devices.

In an embodiment of the present disclosure, a memory device may include a memory media including a plurality of memory units; and a controller configured to set a plurality of memory areas, each including one or more of the plurality of memory units, and store codewords in the plurality of memory areas. The controller may be configured to store one or more first codewords of a first type in a target memory area among the plurality of memory areas, search for a fail memory unit among the plurality of memory units included in the target memory area, and when a fail memory unit is searched, convert one or more of the first codewords into a second codeword having a second type and write the converted second codeword to the memory media.

In another embodiment of the present disclosure, an operating method of a memory device may include setting a plurality of memory areas each including one or more of a plurality of memory units included in a memory media; storing one or more first codewords of a first type in a target memory area among the plurality of memory areas; searching for a fail memory unit among the plurality of memory units included in the target memory area; and when a fail memory unit is searched, converting one or more of the first codewords into a second codeword having a second type and writing the converted second codeword to the memory media.

In another embodiment of the present disclosure, a memory device may include a memory media including a plurality of memory units; and a controller including a first error detection and correction circuit for detecting error bit position and executing error correction for a codeword of a first type and a second error detection and correction circuit for detecting error bit position and executing error correction for a codeword of a second type. The controller may be configured to set a plurality of memory areas each including one or more of the plurality of memory units, store one or more first codewords of the first type in a first memory area among the plurality of memory areas, store one or more second codewords of the second type in a second memory area among the plurality of memory areas, execute error correction for the first codewords through the first error detection and correction circuit, execute error correction for the second codewords through the second error detection and correction circuit, and determine one or more memory units included in the second memory area as fail memory unit.

According to the embodiment of the present disclosure, it is possible to improve error correction capability in areas where failures are likely to occur.

DETAIL DESCRIPTION

Figure 1:
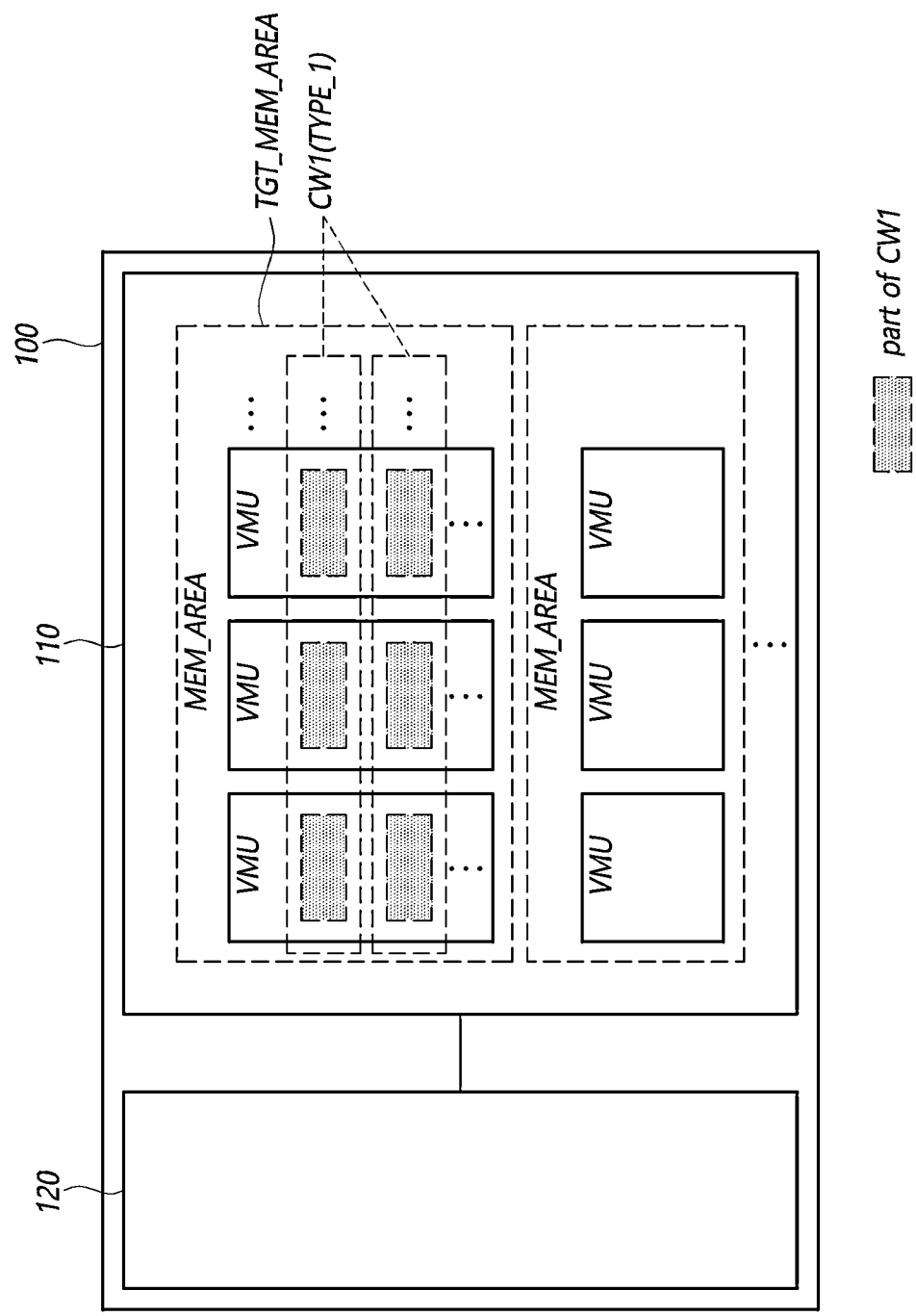
FIG. 1 is a schematic diagram of a memory device according to an embodiment of the present disclosure.

Hereinafter, embodiments of the present disclosure are described in detail with reference to the accompanying drawings. Throughout the specification, references to "an embodiment," "another embodiment" or the like are not necessarily to only one embodiment, and different references to any such phrase are not necessarily limited to the same embodiment(s). The term "embodiments" when used herein does not necessarily refer to all embodiments.

Various embodiments of the present invention are described below in more detail with reference to the accompanying drawings. However, the present invention may be embodied in different forms and variations, and the disclosure should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic diagram of a memory device according to an embodiment of the present disclosure.

Referring to FIG. 1, a memory device 100 may include a memory media 110 and a controller 120.

The memory media 110 may include a plurality of memory units VMU. Each of the plurality of memory units VMU may store data.

The controller 120 may set a plurality of memory areas MEM_AREA for the memory media 110. Each of the plurality of memory areas MEM_AREA may include one or more of the plurality of memory units VMU.

The controller 120 may store codewords in the plurality of memory areas MEM_AREA. A codeword may include data of a first unit size (e.g., 64 bytes) and parity of a second unit size (e.g., 16 bytes). Data included in the codeword may consist of one or more symbols.

Depending on the type of codeword, the error correction capability for the codeword may vary. For example, if a codeword includes 18 parities, 9 symbol errors at random positions in the codeword or 18 symbol errors at specific positions can be corrected.

In the embodiments of the present disclosure, the controller 120 may store one or more first codewords CW1 in a target memory area TGT_MEM_AREA selected from among the plurality of memory areas MEM_AREA. A first codeword may have a first type TYPE_1.

In FIG. 1, one first codeword CW1 may be distributed and stored in memory units VMU included in the target memory area TGT_MEM_AREA. However, one first codeword CW1 does not necessarily need to be distributed across memory units VMU included in the target memory area TGT_MEM_AREA, and the one first codeword CW1 may be stored entirely in one memory unit VMU.

In the embodiments of the present disclosure, the controller 120 may change the type of the codeword stored in the target memory area TGT_MEM_AREA in order to increase error correction performance for the target memory area TGT_MEM_AREA. Hereinafter, this will be described in detail below with reference to FIG. 2.

The controller 120 may exchange various command signals and data signals with the memory media 110 to execute the above-described operations.

The memory media 110 may be implemented in various ways.

For example, the memory media 110 may be implemented as a dynamic random access memory media including a plurality of banks. The memory media 110 may store data in the plurality of banks and read data stored in the plurality of banks.

The memory media 110 may execute a periodic refresh operation to maintain stored data. If the power supply to the memory media 110 is cut off, the data stored in the memory media 110 is lost.

Each of the plurality of banks may include a plurality of matrices, and each of the memory units VMU may consist of one bank, a plurality of matrices, one matrix, or other possible combinations.

In another example, the memory media 110 may be implemented as a dynamic random access memory media including a plurality of chips. Each of the plurality of chips included in the memory media 110 may include a plurality of banks, and each of the plurality of banks may include a plurality of matrices. Each of the memory units VMU may consist of one chip, one bank, a plurality of matrices, or one matrix, etc.

In yet another example, the memory media 110 may be implemented as a non-volatile memory media (e.g., NAND flash). Each of the memory units VMU may consist of a die, a plane, or a memory block included in the memory media 110.

The controller 120 may also be implemented in various ways.

For example, the controller 120 may be implemented as an integrated circuit including logic gates for executing the above-described operations. The controller 120 may be implemented as an application specific integrated circuit (ASIC), a field programmable gate array (FPGA), etc.

In another example, the controller 120 may include a processor. The processor controls the operation of processing a plurality of operation requests, and a working memory of the controller 120 can store data necessary to process the plurality of operation requests.

The processor may control the operation of the controller 120 by executing firmware. The processor may run firmware to control overall operations of the controller 120 and perform logical operations. The firmware is program that is executed within the controller 120 to run the controller 120, and may include binary data in which codes for executing the above-described operations and logical operations are defined.

The firmware may be stored in a storage space (e.g., working memory, ROM, flash memory) located inside or outside the controller 120. The processor may load all or part of the firmware stored in the storage space.

The working memory may store data (e.g., multiple operation requests, firmware) necessary for the controller 120 to process multiple operation requests. For example, the working memory may include separate volatile memory (e.g., SRAM).

Figure 2:
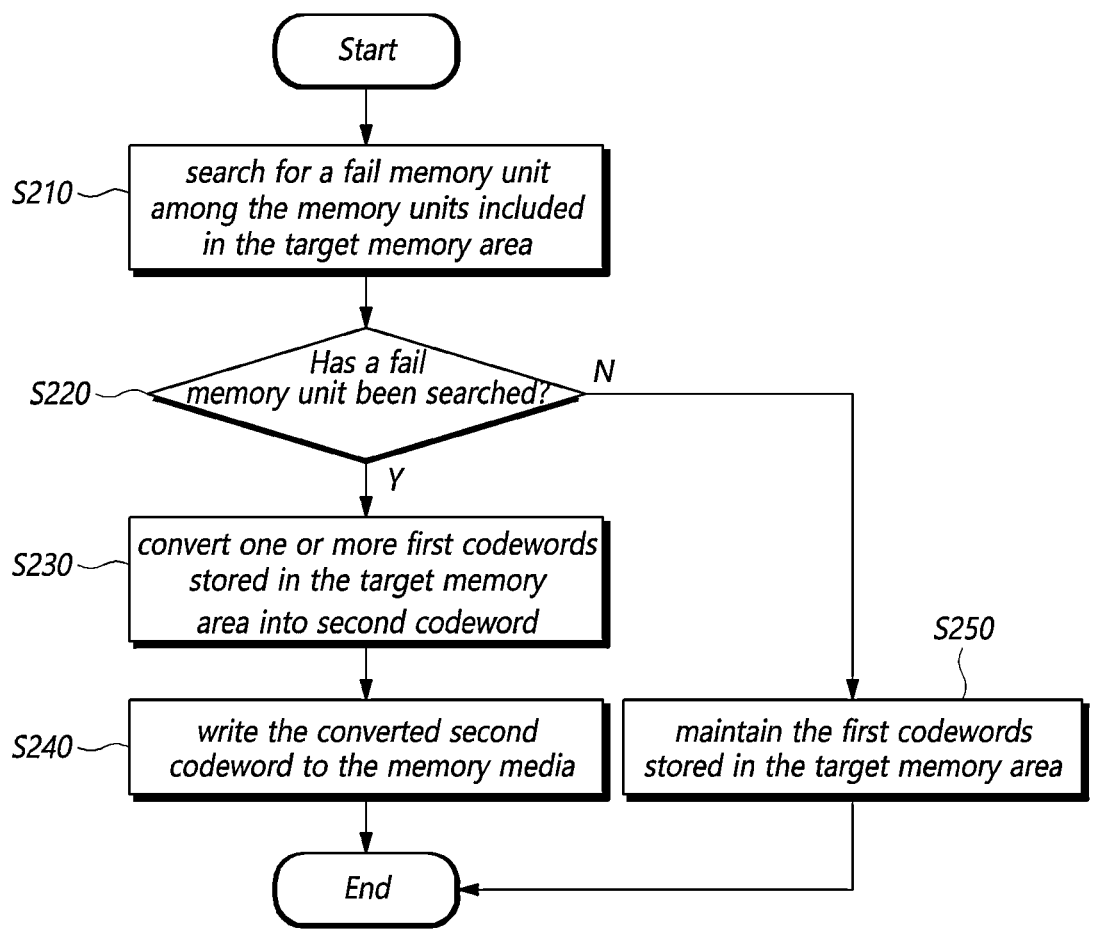
FIG. 2 is a flow chart showing an operation of a memory device according to an embodiment of the present disclosure.

FIG. 2 is a flow chart showing an operation of a memory device according to an embodiment of the present disclosure.

Referring to FIG. 2, a controller 120 of a memory device 100 may search for a fail memory unit from among the memory units VMU included in the memory area TGT_MEM_AREA (S210), as described above and illustrated in FIG. 1.

A fail memory unit may be defined as a memory unit that is predicted to cause errors in stored codewords due to factors such as physical defects. The controller 120 may classify memory units VMU into fail memory units and normal memory units.

The controller 120 may determine whether a fail memory unit, from among the memory units VMU included in the target memory area TGT_MEM_AREA (S220), has been searched. The controller 120 may determine whether each of the memory units VMU included in the target memory area TGT_MEM_AREA is a fail memory unit, which will be described below with reference to FIG. 4.

When it is determined that a fail memory unit exists in the memory units VMU included in the target memory area TGT_MEM_AREA (S220-Y), the controller 120 may convert one or more first codewords stored in the target memory area TGT_MEM_AREA into one second codeword (S230), and write the converted second codeword to a memory media 110 (S240). This conversion will be described below with reference to FIG. 3.

The second codeword may have a second type. That is, the controller 120 may convert the type of the codeword stored in the target memory area TGT_MEM_AREA from a first type to a second type.

Among the plurality of memory areas MEM_AREA, the second codeword of the second type may be stored in the target memory area TGT_MEM_AREA, and the first codeword of the first type may be stored in the remaining memory areas excluding the target memory area TGT_MEM_AREA.

When it is determined that there is no fail memory unit among the memory units VMU (S220-N), the controller 120 may maintain the first codewords stored in the target memory area TGT_MEM_AREA without converting them (S250).

Figure 3:
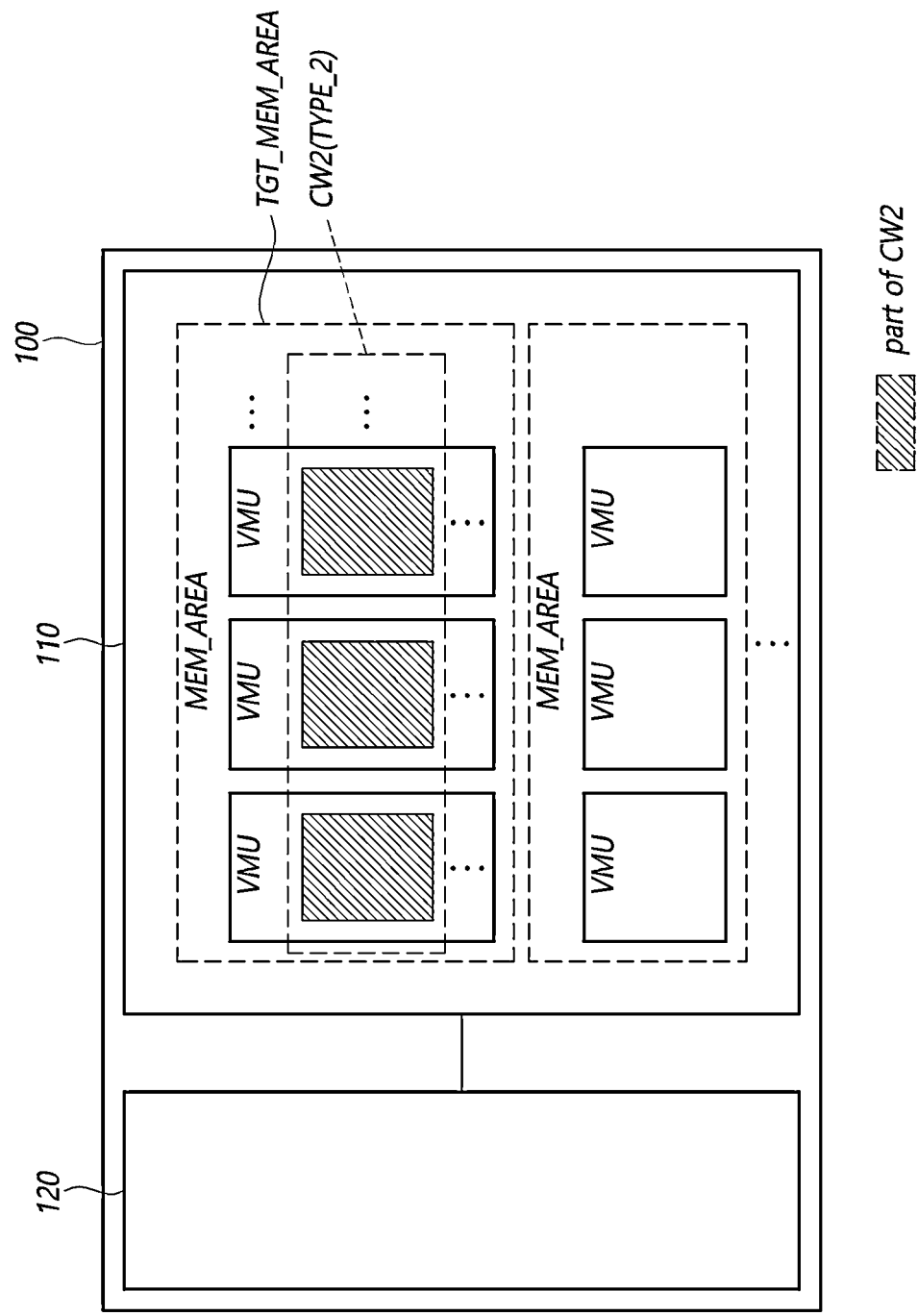
FIG. 3 is a diagram showing an operation in which a memory device writes a second codeword according to an embodiment of the present disclosure.

FIG. 3 is a diagram showing an operation in which a memory device writes a second codeword according to an embodiment of the present disclosure.

Referring to FIG. 3, a controller 120 of a memory device 100 may write a second codeword CW2 having a second type TYPE_2 to a target memory area TGT_MEM_AREA.

The second codeword CW2, like the above-described first codeword CW1, may be distributed and stored in memory units VMU included in the target memory area TGT_MEM_AREA.

In FIG. 3, the second codeword CW2 is stored in the target memory area TGT_MEM_AREA, which is one of a plurality of memory areas MEM_AREA. In other embodiments, the second codeword CW2 is stored in the memory media 110 but not necessarily limited to the target memory area TGT_MEM_AREA.

For example, the controller 120 may store the second codeword CW2 in a memory area MEM_AREA, from among the plurality of memory areas MEM_AREA, other than the target memory area TGT_MEM_AREA.

Figure 4:
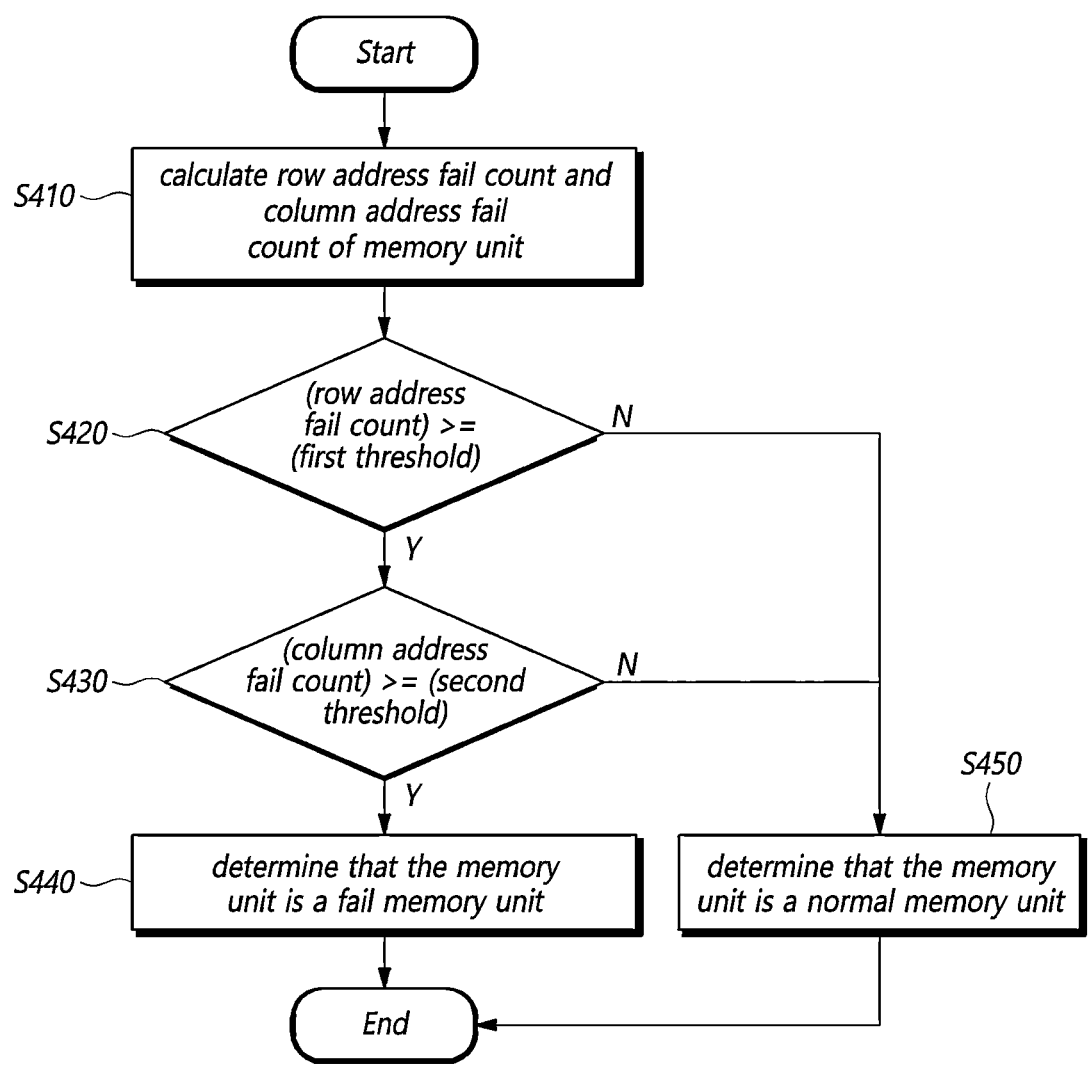
FIG. 4 is a flow chart showing an operation in which a memory device determines whether a memory unit is a fail memory unit according to an embodiment of the present disclosure.

FIG. 4 is a flow chart showing an example of an operation in which a memory device determines whether a memory unit is a fail memory unit according to an embodiment of the present disclosure.

Referring to FIG. 4, a controller 120 of a memory device 100 may calculate a row address fail count and a column address fail count for a memory unit (S410).

The row address fail count may be determined by the number of rows in which a fail occurred in the memory unit, and the column address fail count may be determined by the number of columns in which a fail occurred in the memory unit. The controller 120 may calculate the row address fail count and column address fail count based on accumulated error information for the memory unit.

Then, the controller 120 may determine whether the row address fail count of the memory unit is greater than or equal to a first threshold (S420).

When the row address fail count is greater than or equal to the first threshold (S420-Y), the controller 120 may determine whether the column address fail count of the memory unit is greater than or equal to a second threshold (S430).

When the column address fail count is greater than or equal to the second threshold (S430-Y), the controller 120 may determine that the memory unit is a fail memory unit (S440).

On the other hand, when the row address fail count of the memory unit is less than the first threshold (S420-N) or the column address fail count is less than the second threshold (S430-N), the controller 120 may determine that the memory unit is a normal memory unit (S450).

Hereinafter, a specific method by which memory device 100 converts one or more first codewords CW1 into one second codeword CW2 will be described.

Figure 5:
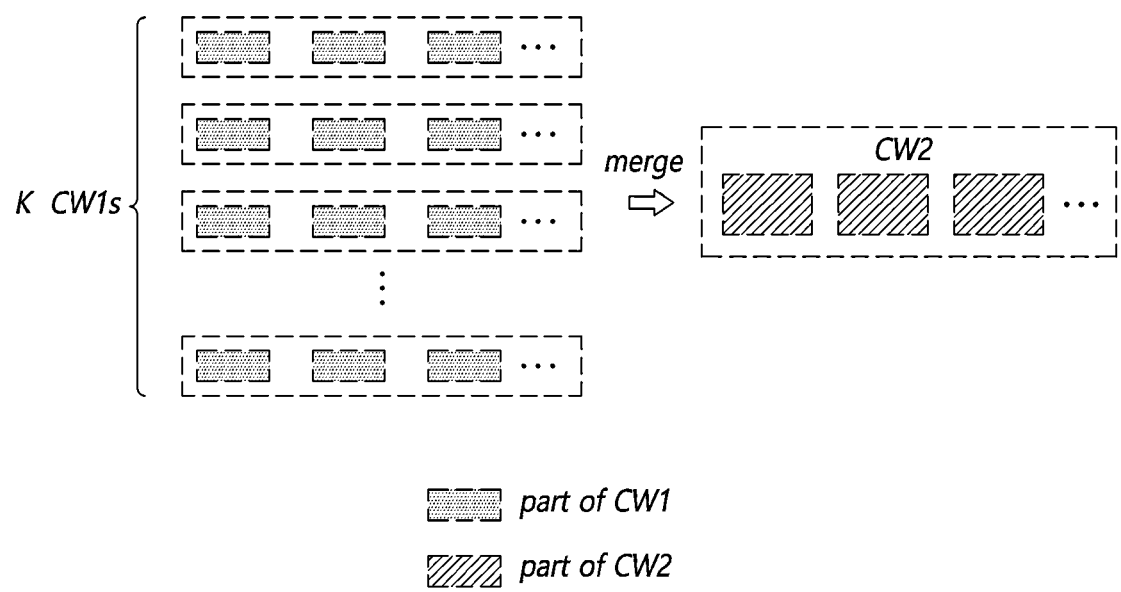
FIG. 5 is a diagram showing an operation in which a memory device generates a second codeword according to an embodiment of the present disclosure.

FIG. 5 is a diagram showing an operation in which a memory device generates a second codeword according to an embodiment of the present disclosure.

Referring to FIG. 5, a controller 120 of a memory device 100 may merge a K number (where K is a natural number of 2 or more) of first codewords CW1, out of all first codewords CW1, stored in the target memory area TGT_MEM_AREA and convert them into one second codeword CW2. The size of the second codeword CW2 may be K times the size of the first codeword.

For example, when two first codewords each consists of 64 bytes of data and 16 bits of parity, the controller 120 may merge the two first codewords to generate one second codeword consisting of 128 bytes of data and 32 bits of parity.

When merging the K first codewords into the one second codeword CW2, the controller 120 may read the K number of first codewords from the target memory area TGT_MEM_AREA, generate merged data based on the data stored in the K first codewords, and reconstruct parity for the merged data. In addition, the controller 120 may generate the second codeword CW2 based on the merged data and the parity for the merged data, and may write the generated second codeword CW2 to the memory media 110.

The error correction capability when using the second codeword CW2 is higher than the first codeword CW1 because the second codeword CW2 has a larger parity size. Therefore, even if a portion of the second codeword CW2 is stored in a fail memory unit, the controller 120 may correct an error occurring in the second codeword CW2 with a higher probability through an error detection and correction circuit. As a result, error correction capability may be improved for the target memory area TGT_MEM_AREA where defects are likely to occur because of fail memory units.

Hereinafter, a location where a converted second codeword CW2 is written will be described.

Figure 6:
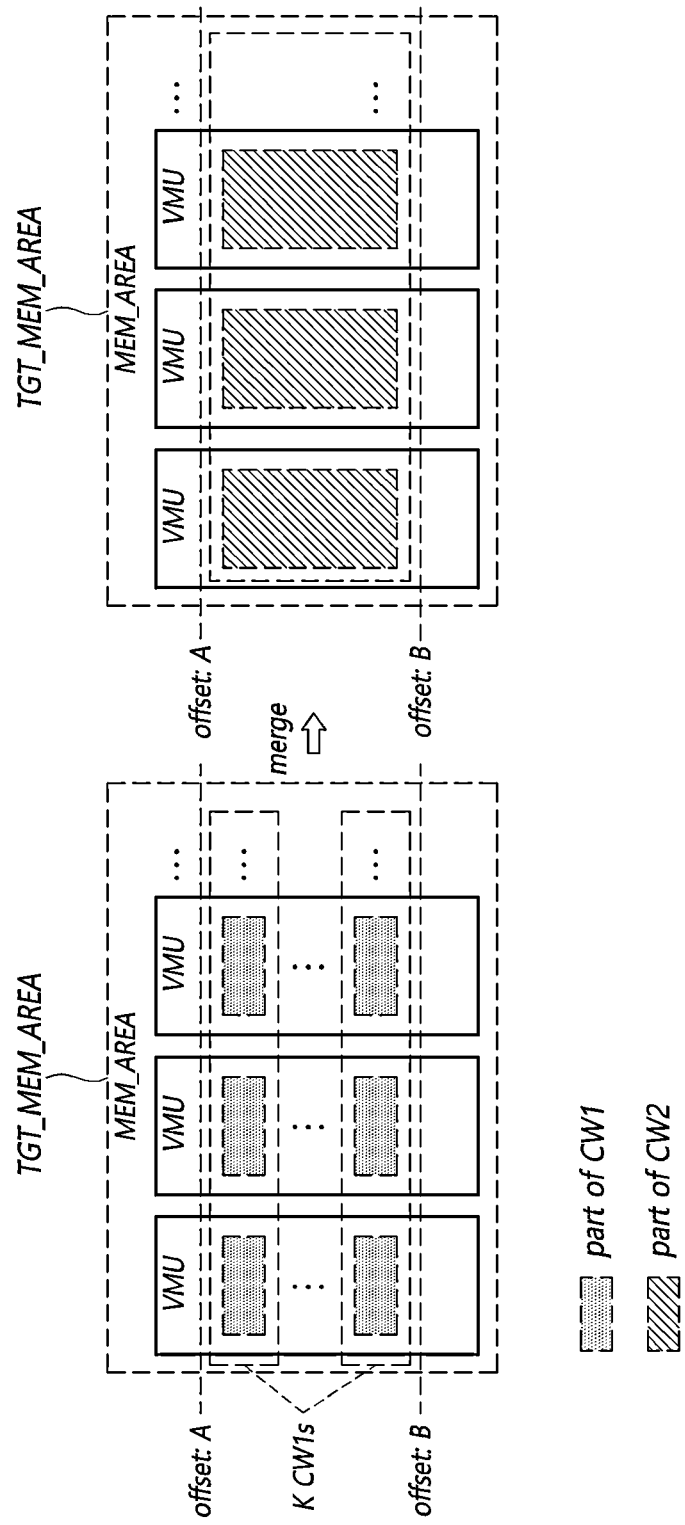
FIG. 6 is a diagram showing an operation in which a memory device overwrites a second codeword to a location where a K number of first codewords are stored according to an embodiment of the present disclosure.

FIG. 6 is a diagram showing an operation in which a memory device overwrites a second codeword to a location where a K number of first codewords CW1 are stored according to an embodiment of the present disclosure.

Referring to FIG. 6, a controller 120 may overwrite a second codeword CW2 to a location where a merged K number of first codewords CW1 are stored in a target memory area TGT_MEM_AREA.

In FIG. 6, the K number of first codewords CW1 are distributed and stored in an area between offset A and offset B in the target memory area TGT_MEM_AREA.

A second codeword CW2 may be generated by merging the K number of first codewords, and the controller 120 may overwrite the second codeword CW2 between offset A and offset B, where the K number of first codewords CW1 are stored.

Figure 7:
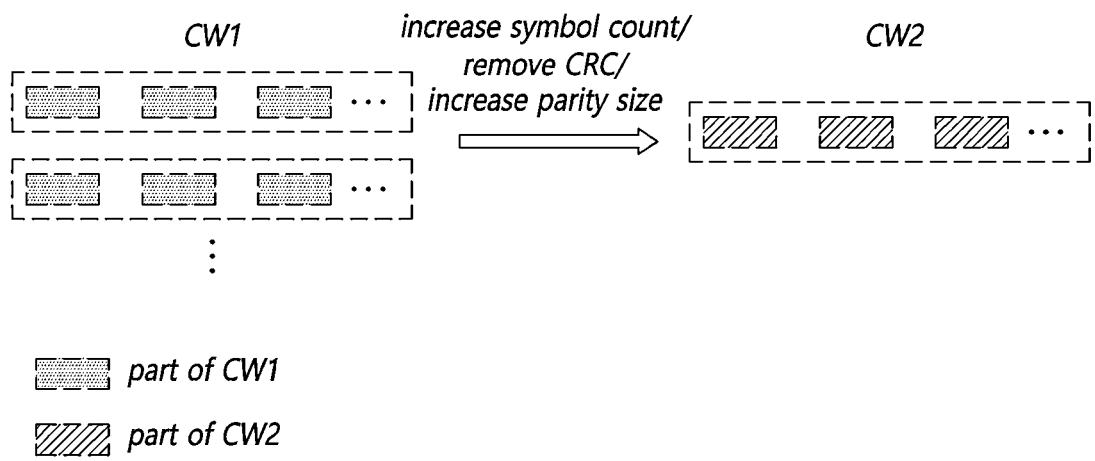
FIG. 7 is a diagram showing an operation in which a memory device generates a second codeword according to an embodiment of the present disclosure.

FIG. 7 is a diagram showing an operation in which a memory device generates a second codeword according to an embodiment of the present disclosure.

Referring to FIG. 7, a controller 120 of a memory device 100 may convert one or more of the first codewords stored in the target memory area TGT_MEM_AREA into a second codeword CW2 by executing at least one of an operation to allow an increase in total number of symbols by reducing size per symbol, an operation to remove CRC (cyclic redundancy check), and an operation to increase size of parity.

Figure 8:
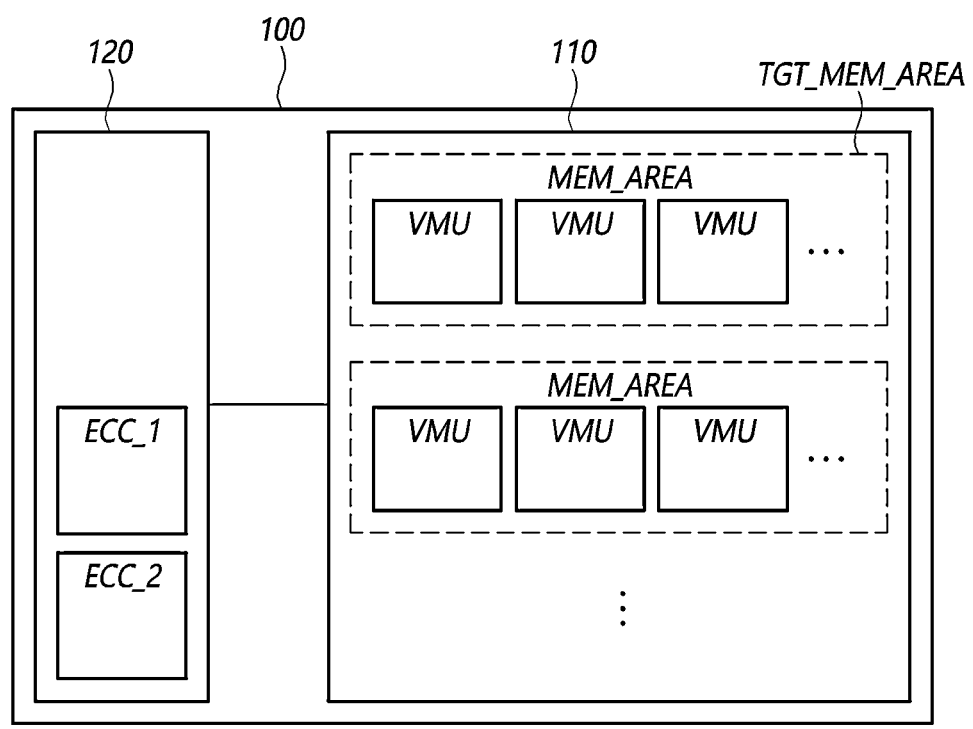
FIG. 8 is a schematic diagram of a memory device according to an embodiment of the present disclosure.

FIG. 8 is a schematic diagram of a memory device according to an embodiment of the present disclosure.

Referring to FIG. 8, a controller 120 of a memory device 100 may further include a first error detection and correction circuit ECC_1 and a second error detection and correction circuit ECC_2.

The first error detection and correction circuit ECC_1 is a circuit that detects error bit position and executes error correction for the above-described first type TYPE_1 of codeword.

The second error detection and correction circuit ECC_2 is a circuit that detects error bit position and executes error correction for the above-described second type TYPE_2 of codeword.

The first error detection and correction circuit ECC_1 and the second error detection and correction circuit ECC_2 may be implemented to decode data for a codeword input as an error correction code, and may be implemented with various code decoders. For example, a decoder that performs unsystematic code decoding or a decoder that performs systematic code decoding may be used.

The first error detection and correction circuit ECC_1 and the second error detection and correction circuit ECC_2 may calculate the bit error rate (BER) for input data and determine whether error correction for the input data is possible.

For example, the first error detection and correction circuit ECC_1 and the second error detection and correction circuit ECC_2 may determine the data as uncorrectable or a fail when the bit error rate (BER) is greater than or equal to a set reference value. In another example, the first error detection and correction circuit ECC_1 and the second error detection and correction circuit ECC_2 may determine the data as correctable or pass when the bit error rate (BER) is lower than the reference value.

The first error detection and correction circuit ECC_1 and the second error detection and correction circuit ECC_2 may output error-corrected data if the error can be corrected.

In embodiments of the present disclosure, error correction capability of the first error detection and correction circuit ECC_1 and the second error detection and correction circuit ECC_2 may be different from each other. That is, the first error detection and correction circuit ECC_1 and the second error detection and correction circuit ECC_2 may have different maximum allowable error bit numbers.

In embodiments of the present disclosure, the controller 120 may use different error detection and correction circuits for error correction of codewords depending on the type of codeword. This will be described in detail in FIGS. 9 to 10 below.

Figure 9:
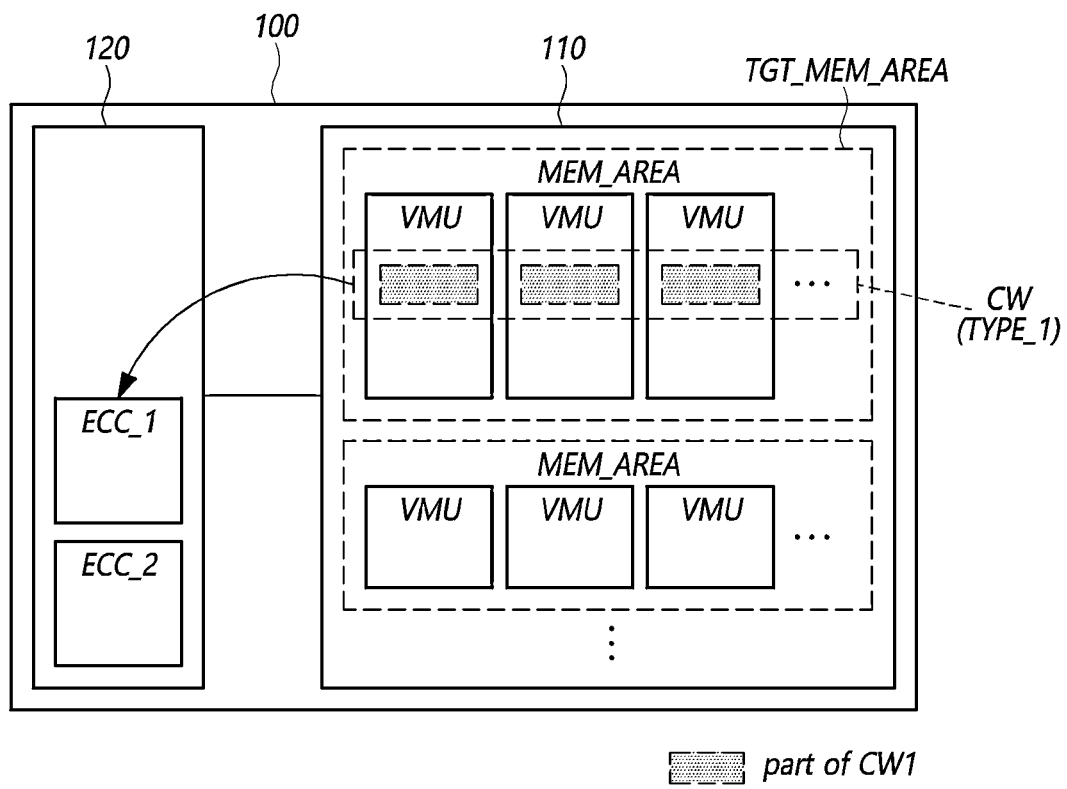
FIG. 9 is a diagram showing an operation in which a memory device executes error correction on a codeword stored in a target memory area according to an embodiment of the present disclosure.

FIG. 9 is a diagram showing an operation in which a memory device executes error correction on a codeword stored in a target memory area TGT_MEM_AREA according to an embodiment of the present disclosure.

Referring to FIG. 9, when the type of a codeword CW stored in a target memory area TGT_MEM_AREA is a first type TYPE_1, a controller 120 of a memory device 100 may execute error correction for the codeword using a first error detection and correction circuit ECC_1.

Figure 10:
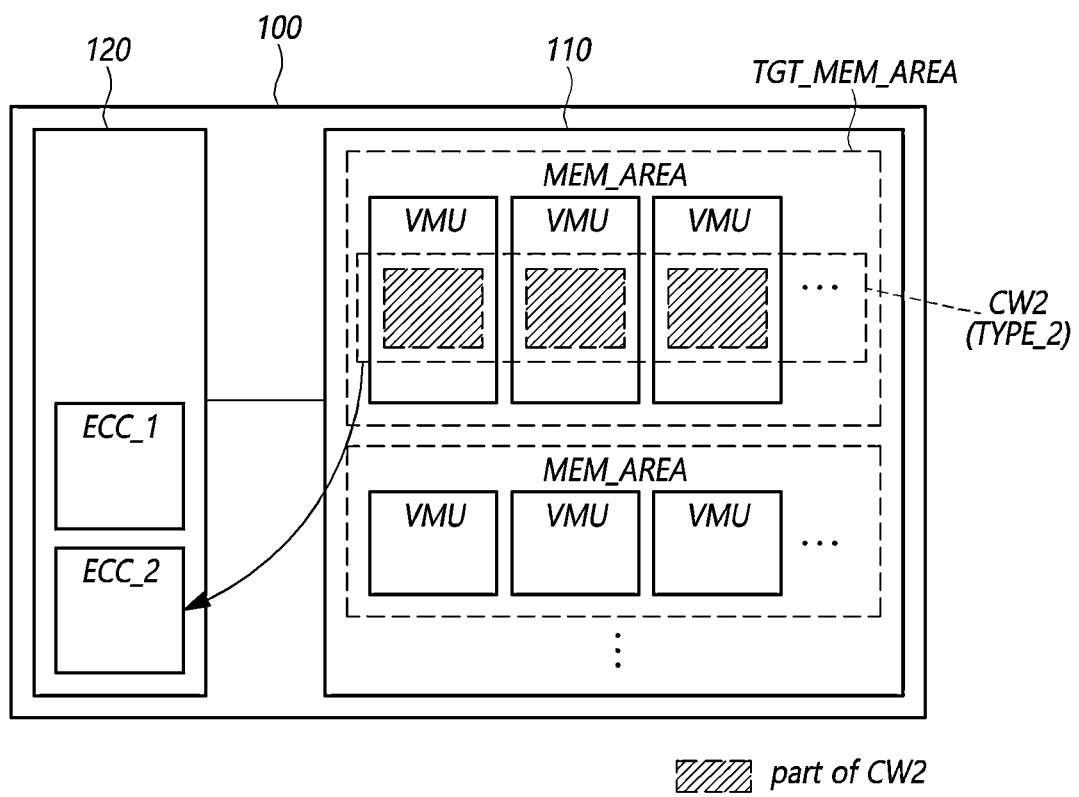
FIG. 10 is a diagram showing an operation in which a memory device executes error correction on a codeword stored in a target memory area according to an embodiment of the present disclosure.

FIG. 10 is a diagram showing an operation in which a memory device executes error correction on a codeword stored in a target memory area according to an embodiment of the present disclosure.

Referring to FIG. 10, when the type of a codeword stored in a target memory area TGT_MEM_AREA is a second type TYPE_2, a controller 120 of a memory device 100 may execute error correction for the codeword using a second error detection and correction circuit ECC_2.

Figure 11:
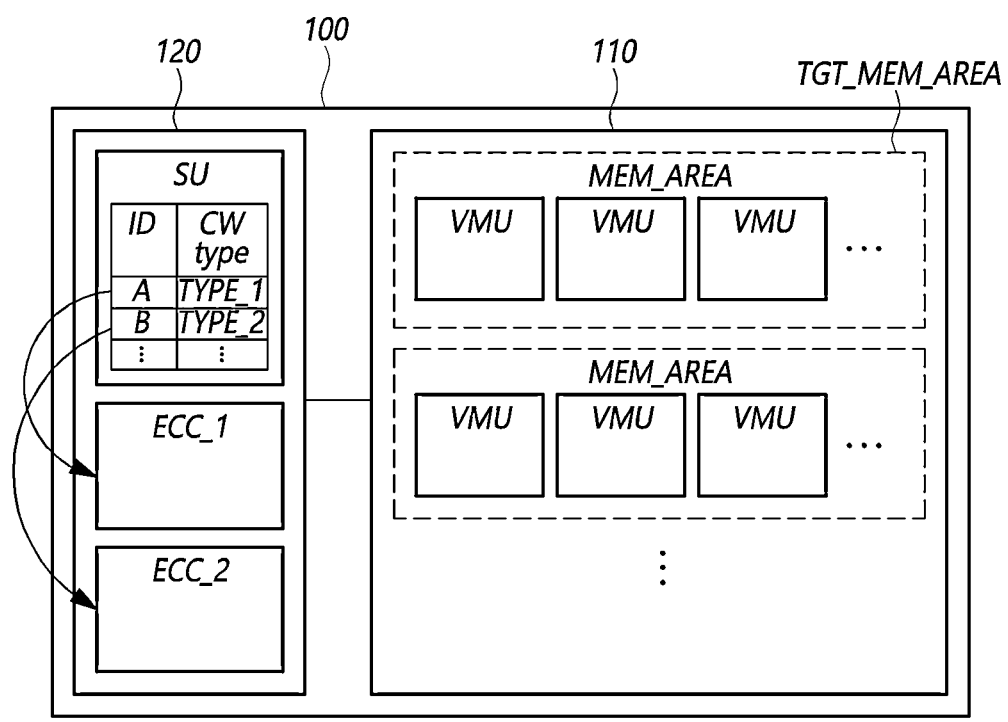
FIG. 11 is a diagram showing an operation in which a memory device determines a type of a codeword using mapping information according to an embodiment of the present disclosure.

FIG. 11 is a diagram showing an operation in which a memory device determines a type of a codeword using mapping information according to an embodiment of the present disclosure.

Referring to FIG. 11, a controller 120 of a memory device 100 may include a storage unit SU that stores mapping information indicating the type of codeword mapped to each of a plurality of memory areas MEM_AREA.

For example, the storage unit SU may be implemented with a separate register, volatile memory (e.g., SRAM), non-volatile memory (e.g., NAND flash, NOR flash, PRAM, MRAM), etc.

The mapping information may be implemented with various data structures such as table, list, array, and hash, etc. The mapping information may indicate an identifier (e.g., address, index) for identifying a specific memory area and the type of codeword mapped to the identifier.

When receiving an identifier ID corresponding to a target memory area TGT_MEM_AREA, the controller 120 may search for the type of codeword mapped to the identifier in the mapping information.

The controller 120 may determine that the type of the codeword stored in the target memory area TGT_MEM_AREA is the same as the type of the searched codeword.

Operations of a memory device 100 to change the type of the codeword stored in a specific memory area among the plurality of memory areas MEM_AREA have been described.

When the type of the codeword stored in a specific memory area changes, a memory device 100 may store codewords of two different types. Hereinafter, this will be described in detail in FIG. 12.

Figure 12:
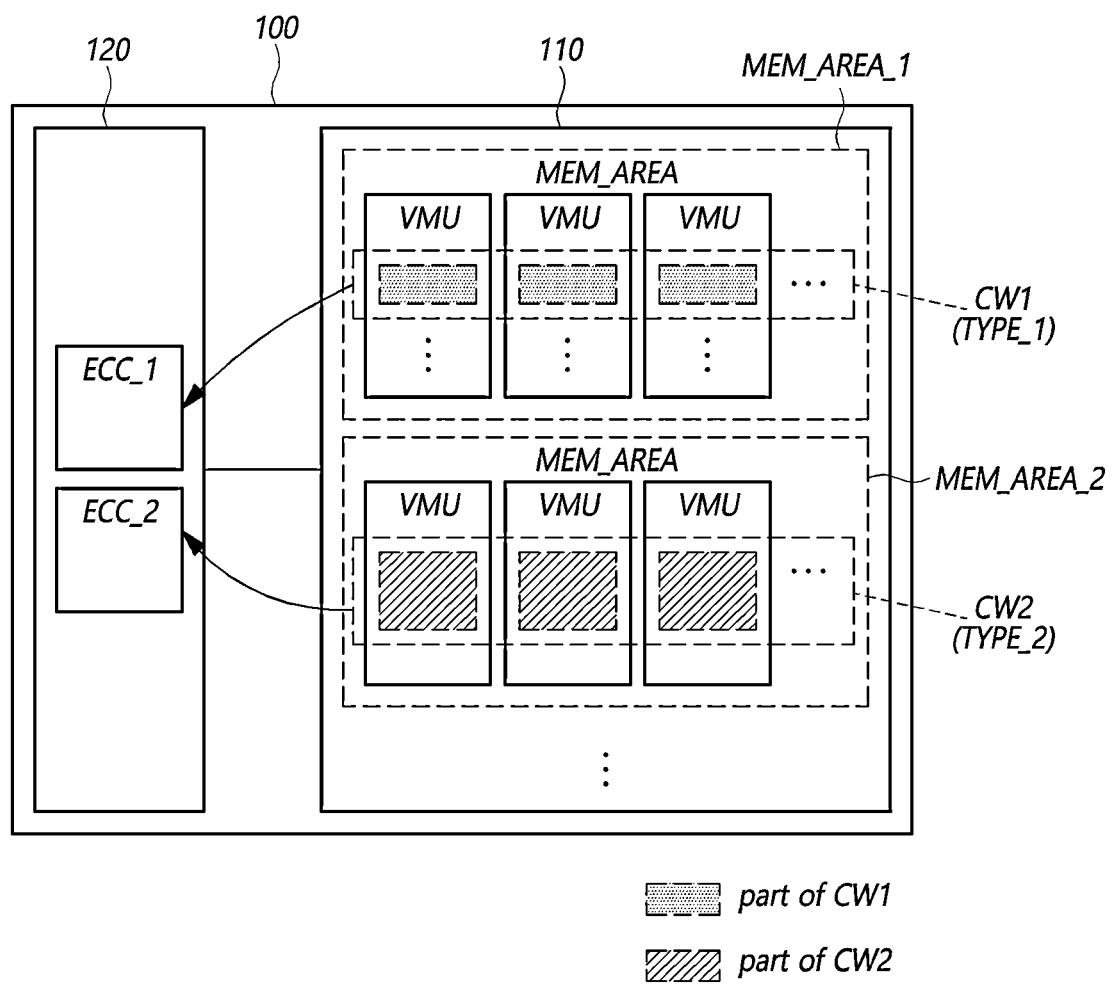
FIG. 12 is a schematic diagram of a memory device according to an embodiment of the present disclosure.

FIG. 12 is a schematic diagram of a memory device according to an embodiment of the present disclosure.

Referring to FIG. 12, as in FIG. 1, a memory media 110 of a memory device 100 may include a plurality of memory units VMU.

In addition, a controller 120 of the memory device 100 may include a first error detection and correction circuit ECC_1 and a second error detection and correction circuit ECC_2, as shown in FIG. 8.

The controller 120 may set a plurality of memory areas MEM_AREA illustrated in FIG. 1.

The controller 120 may store one or more first codewords CW1 of a first type TYPE_1 in a first memory area MEM_AREA_1, from among a plurality of memory areas MEM_AREA.

The controller 120 may store one or more second codewords CW2 of a second type TYPE_2 in a second memory area MEM_AREA_2, from among the plurality of memory areas MEM_AREA. The controller 120 may determine that one or more of the memory units included in the second memory area MEM_AREA_2 is a fail memory unit.

Figure 13:
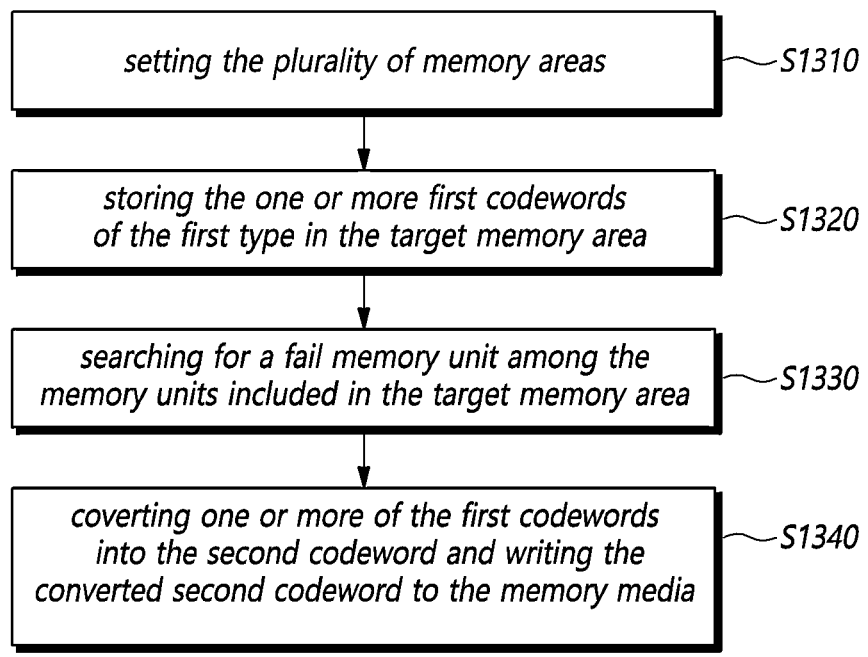
FIG. 13 is a diagram showing a method of operating a memory device according to an embodiment of the present disclosure.

FIG. 13 is a diagram showing a method of operating a memory device according to an embodiment of the present disclosure.

Referring to FIG. 13, a method of operation a memory device 100 may include setting a plurality of memory areas MEM_AREA (S1310). Each of the plurality of memory areas MEM_AREA may include one or more of a plurality of memory units VMU included in a memory media 110.

A method of operating the memory device 100 may include storing one or more first codewords CW1 of a first type TYPE_1 in a target memory area TGT_MEM_AREA, from among the plurality of memory areas MEM_AREA (S1320).

A method of operating the memory device 100 may include searching for a fail memory unit from among the memory units VMU included in the target memory area TGT_MEM_AREA (S1330).

For example, an operation S1330 may determine a memory unit, from among the memory units VMU included in the target memory area TGT_MEM_AREA, having a row address fail count equal to or greater than the first threshold and a column address fail count equal to or greater than the second threshold as the fail memory unit.

The operating method of the memory device 100 may include, when the fail memory unit is searched for among the memory units VMU included in the target memory area TGT_MEM_AREA, converting one or more of first codewords CW1 stored in the target memory area TGT_MEM_AREA into a second codeword CW2 having a second type TYPE_2 and writing the converted second codeword CW2 to the memory media 110 (S1340).

For example, in operation S1340, the controller 120 may merge a K number (where K is a natural number greater than or equal to 2) of the first codewords CW1 stored in the target memory area TGT_MEM_AREA and convert the K number of the first codewords CW1 into the second codeword CW2. In this case, the size of the second codeword CW2 may be a K number of times the size of the first codeword. The operation S1340 may overwrite the converted second codeword CW2 to a location where merged K first codewords CW1 are stored in the target memory area TGT_MEM_AREA.

In another example, the operation S1340 may convert one or more of the first codewords CW1 stored in the target memory area TGT_MEM_AREA into the second codeword CW2 by executing at least one of an operation to permit an increase in total number of symbols by reducing size per symbol, an operation to remove CRC, and an operation to increase size of parity.

An operating method of the memory device 100 may further include determining the type of codeword stored in the target memory area TGT_MEM_AREA; executing error correction for the codeword through the first error detection and correction circuit ECC_1 for detecting error bit position and executing error correction for the first type TYPE_1 of codeword when the type of the codeword stored in the target memory area TGT_MEM_AREA is the first type TYPE_1; and executing error correction for the codeword through the second error detection and correction circuit ECC_2 for detecting error bit position and executing error correction for the second type TYPE_2 of codeword when the type of the codeword stored in the target memory area TGT_MEM_AREA is the second type TYPE_2.

the process of determining the type of codeword stored in the target memory area TGT_MEM_AREA may include receiving an identifier corresponding to the target memory area TGT_MEM_AREA; searching for the type of codeword mapped to the identifier in mapping information indicating the type of codeword mapped to each of the plurality of memory areas MEM_AREA; and setting the searched type of codeword as the type of codeword stored in the target memory area TGT_MEM_AREA.

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A memory device comprising:
a memory media including a plurality of memory units; and
a controller configured to:
set a plurality of memory areas, each of the plurality of memory areas including one or more of the plurality of memory units,
store one or more first codewords of a first type in a target memory area among the plurality of memory areas,
search for a fail memory unit among the memory units included in the target memory area, and
when the search for a fail memory unit succeeds, convert one or more of the first codewords into a second codeword having a second type and write the converted second codeword to the memory media,
wherein the controller is configured to merge a K number of the first codewords stored in the target memory area into a second codeword, wherein a size of the second codeword is larger than a size of each of the first codewords, and
wherein K is a natural number greater than or equal to 2.

2. The memory device according to claim 1,
wherein the controller is configured to determine a memory unit, from among the memory units included in the target memory area, having a row address fail count equal to or greater than a first threshold and a column address fail count equal to or greater than a second threshold as the fail memory unit.

3. The memory device according to claim 1,
wherein the size of the second codeword is a K number of times the size of one of the first codewords.

4. The memory device according to claim 1,
wherein the controller is configured to overwrite the converted second codeword to a location where the merged K number of first codewords are stored in the target memory area.

5. The memory device according to claim 1,
wherein the controller is configured to convert one or more of the first codewords stored in the target memory area into the second codeword by executing at least one of an operation to allow an increase in total number of symbols by reducing size per symbol, an operation to remove cyclic redundancy check (CRC), and an operation to increase size of parity.

6. The memory device according to claim 1, further comprising:
a first error detection and correction circuit for detecting error bit position and executing error correction for the first type of codeword, and
a second error detection and correction circuit for detecting error bit position and executing error correction for the second type of codeword,
wherein the controller is configured to:
determine a type of codeword stored in the target memory area,
when the type of the codeword stored in the target memory area is the first type, execute error correction for the codeword through the first error detection and correction circuit, and
when the type of the codeword stored in the target memory area is the second type, execute error correction for the codeword through the second error detection and correction circuit.

7. The memory device according to claim 6, further comprising:
a storage unit that stores mapping information indicating the type of codeword mapped to each of the plurality of memory areas,
wherein the controller is configured to search, using an identifier corresponding to the target memory area, for the type of codeword mapped to the identifier in the mapping information, and
wherein the type of codeword searched by the controller is determined as the type of codeword stored in the target memory area.

8. An operating method of a memory device comprising:
setting a plurality of memory areas, each of the plurality of memory areas including one or more of a plurality of memory units included in a memory media;
storing one or more first codewords of a first type in a target memory area among the plurality of memory areas;
searching for a fail memory unit among the plurality of memory units included in the target memory area; and
when searching the fail memory unit succeeds, converting one or more of the first codewords into a second codeword having a second type and writing the converted second codeword to the memory media,
wherein the converting one or more of the first codewords and writing the second codeword to the memory media merges a K number of the first codewords stored in the target memory area into the second codeword,
wherein a size of the second codeword is larger than a size of each of the first codewords, and
wherein K is a natural number greater than or equal to 2.

9. The method according to claim 8,
wherein the searching for the fail memory unit includes identifying a memory unit, from among the plurality of memory units included in the target memory area, having a row address fail count equal to or greater than a first threshold and a column address fail count equal to or greater than a second threshold as the fail memory unit.

10. The method according to claim 9,
wherein the size of the second codeword is a K number of times the size of one of the first codewords.

11. The method according to claim 9,
wherein the converting one or more of the first codewords and writing the second codeword to the memory media overwrites the converted second codeword to a location where the merged K number of first codewords are stored.

12. The method according to claim 8,
wherein the converting one or more of the first codewords and writing the second codeword to the memory media converts one or more of the first codewords stored in the target memory area into the second codeword by executing at least one of an operation to allow an increase in a total number of symbols by reducing size per symbol, an operation to remove cyclic redundancy check (CRC), and an operation to increase size of parity.

13. The method according to claim 8, further comprising:
determining a type of codeword stored in the target memory area; and
when the type of the codeword stored in the target memory area is the first type, using a first error detection and correction circuit for detecting error bit position and executing error correction for the codeword, and when the type of the codeword stored in the target memory area is the second type, using a second error detection and correction circuit for detecting error bit position and executing error correction for the codeword.

14. The method according to claim 13,
wherein the determining type of codeword stored in the target memory area comprises:
receiving an identifier corresponding to the target memory area;
searching for the type of codeword mapped to the identifier in mapping information that maps the type of codeword to each of the plurality of memory areas; and
applying the searched type of codeword as the type of codeword stored in the target memory area.

15. A memory device comprising:
a memory media including a plurality of memory units; and
a controller including a first error detection and correction circuit for detecting error bit position and executing error correction for a codeword of a first type and a second error detection and correction circuit for detecting error bit position and executing error correction for a codeword of a second type;

wherein the controller is configured to:

set a plurality of memory areas, each of the plurality of memory areas including one or more of the plurality of memory units, store one or more first codewords of the first type in a first memory area among the plurality of memory areas, store one or more second codewords of the second type in a second memory area among the plurality of memory areas, execute error correction for the first codewords through the first error detection and correction circuit, execute error correction for the second codewords through the second error detection and correction circuit, determine one or more memory units included in the second memory area as fail memory unit, and merge a K number of the first codewords stored in the target memory area into a second codeword, wherein a size of the second codeword is larger than a size of each of the first codewords, and wherein K is a natural number greater than or equal to 2.

* * * * *